E. A. SPERRY.
VEHICLE CONTROL.
APPLICATION FILED NOV. 6, 1908.
1,137,804.
Patented May 4, 1915.
2 SHEETS—SHEET 1.
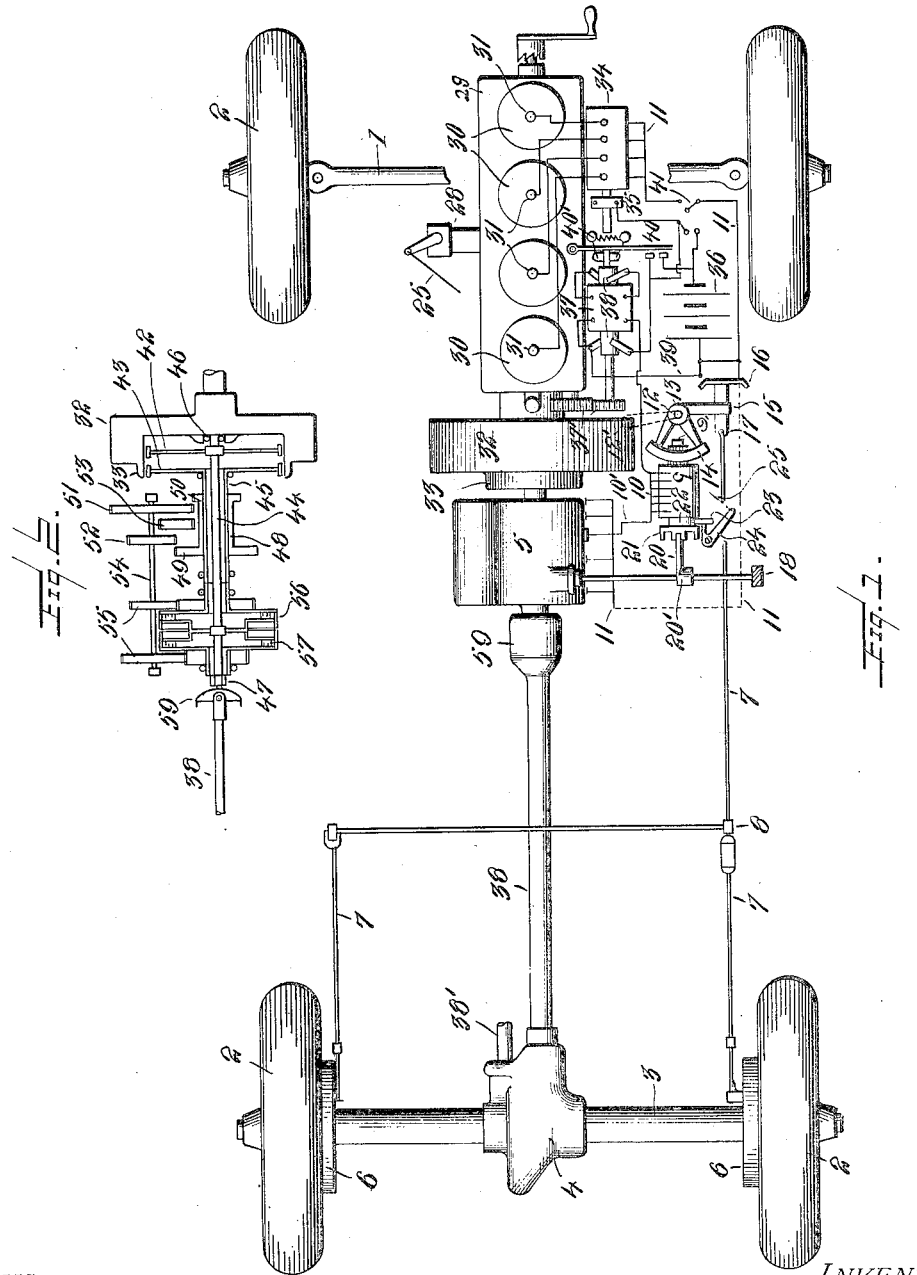
WITNESSES
INVENTOR
Elmer A. Sperry,
BY Buckingham & Ewart
Attorneys.

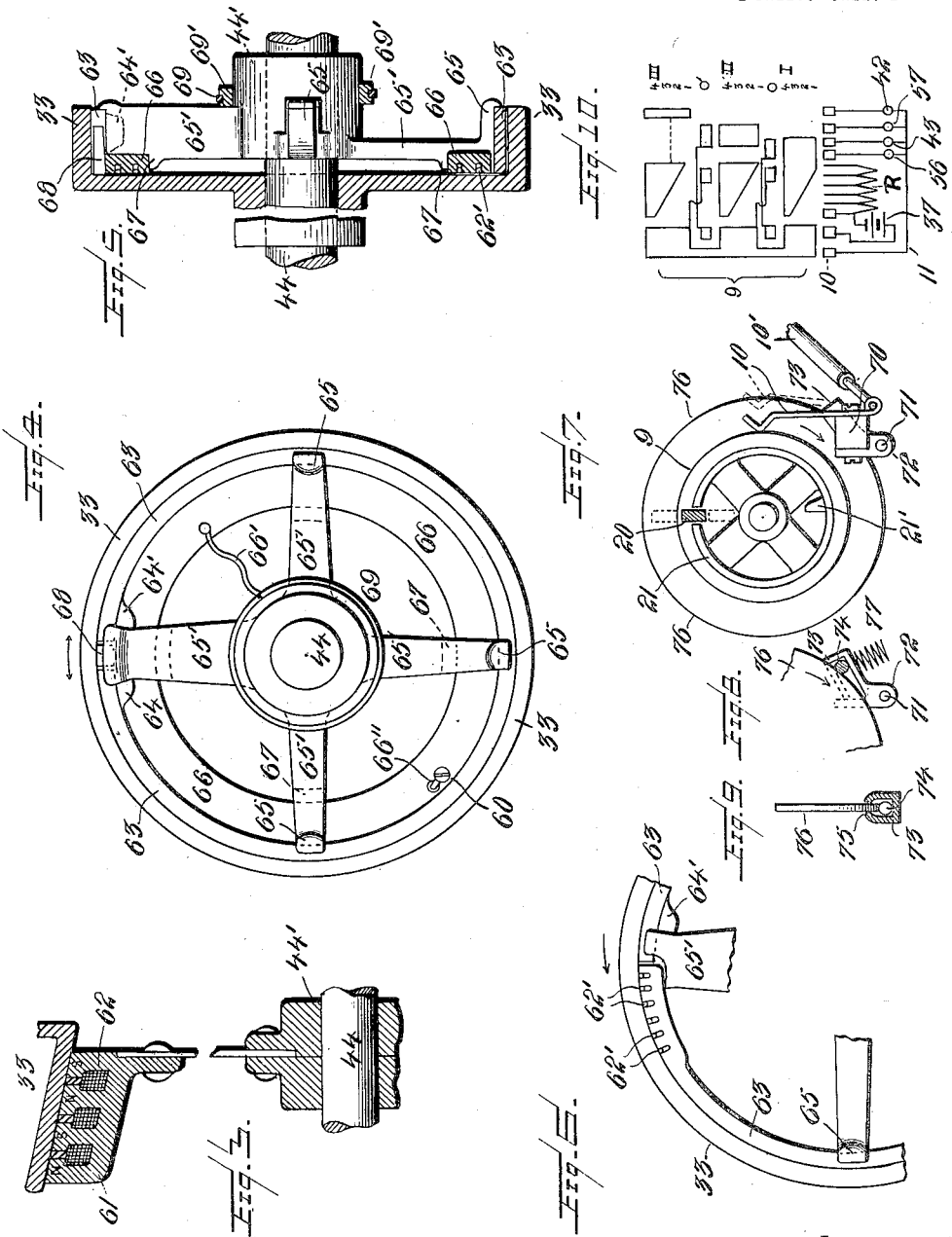

UNITED STATES PATENT OFFICE.

ELMER A. SPERRY, OF BROOKLYN, NEW YORK.

VEHICLE CONTROL.

1,137,804.   Specification of Letters Patent.   Patented May 4, 1915.

Application filed November 6, 1908. Serial No. 461,289.

*To all whom it may concern:*

Be it known that I, ELMER A. SPERRY, a citizen of the United States, residing at Brooklyn, in the county of Kings and State of New York, have invented new and useful Improvements in Vehicle Control, of which the following is a specification.

The object of this invention is to greatly simplify the manipulation of autos operated by combustion motors. The overloading of this class of motors being impracticable, speed reducing gearing is necessary and the invention consists in providing simple and practical means for effecting the necessary gear changes involved in speed control, coöperating and combining with the other necessary adjuncts of the equipment and manipulation factors. In this manner a control equally simple to that of electrical vehicles is secured. To this end the speed control is electrical and accomplished through powerful magnetic metal to metal clutches connected with the direct drive and the change gearing, organized where necessary, for slipping and for gradual power application, manipulated by a small single handle which controls the electrical energy to the magnitude of but a few watts, which serves to handle all the speeds automatically and without volition or even knowledge on the part of the operator; certain interlocks, manipulating and auxiliary features are involved, all of which are shown and described herein, the novelty being pointed out in the claims.

Figure 1 represents the essential mechanism of an automobile, partially in diagram. Fig. 2 illustrates diagrammatically the speed reduction gear and gear change mechanism involving 4 speeds forward and 2 speeds back. Fig. 3 shows one form of a reversible magnetic clutch. Figs. 4 and 5 show another form of reversible magnetic friction clutch. Fig. 6 shows a detail of a one way clutch of the same form as Figs. 4 and 5. Fig. 7 is a detail of the controller, also showing one of the interlocks and also the mounting of the brushes. Figs. 8 and 9 are details of Fig. 7. Fig. 10 shows development of the controller cylinder, together with the brushes, showing also a diagrammatic arrangement of the control circuits of the vehicle.

Referring now to Fig. 1, the forward axles of the vehicle are illustrated at 1, the wheels at 2—2, the back axle at 3, the transmission gear at 4, the radial shaft at 38, the radius rod at 38' and the change speed-gearing at 5. One set of brakes of the vehicle is illustrated at 6—6, with the usual brake manipulating levers and rods, such as 7—7, etc., including the balance lever 8, of any of the usual constructions. The clutches by means of which the various power connections illustrated in Fig. 2 are brought about are of the electro-magnetic type, receiving their power from one or both generators, 36 or 37, through the controller 9, and cable connection 10' and the common return circuits of the various portions of the apparatus shown at 11—11, etc., the wire 39 serving to couple this return circuit to both generators. 12 may illustrate the steering stem coming down from the usual steering wheel handle at 12', shown dotted, serving to illustrate one means of operation of the controller, by means of the hub 13 forming a portion of the segment 14 and gear drive for the controller cylinder 9; an interlocking and operating arm from this segment is indicated at 15, coöperating with the break handle or treadle 16, the connection being effected through the pin 17. By means of this device the controller may be locked from operation when the brake is on and preferably is also moved to a predetermined position, for instance the off-position, or lower speed position, by applying the brake 6, through the engagement between the pin 17 and arm 15. The familiar reverse and change speed lever is shown in section at 18. Attached to or operated by this lever is the arm 20 which engages in one or more slots in the segment or ring 21, mounted upon the shaft of controller 9. This constitutes, as will be seen, an additional double interlock, it not being possible to operate the controller in certain predetermined positions, while in other positions of lever 18, the controller is free to move in the usual manner.

Suitably mounted upon the controller-shaft is a device for controlling the speed of the motor or power source 29; the method illustrated consists of cam 22 and cam roller 23, bell-crank lever 24 operating through rod 25, which disappears under the motor and reappears again at the other side near the carbureter 28, the manipulation of one or more of the valves of which is thus affected by the motions of controller 9, to vary the speed of the power source in any predetermined method — the preferred method being to accelerate the engine before disengaging one of the clutches and just previous to engaging the next higher speed clutch and holding the motor within bounds during such disengagement.

The system of operation of the controller 9 adopted in connection with the present illustration is that of a handle 12' (in dotted lines) upon the steering wheel, which connects to and operates segments 14. The treadle 16 through the pin 17 and arm 15 may move this segment. It will therefore be seen that it is provided with a plurality of operating means.

Referring now to the source of power 29, Fig. 1, it should be stated that 30 represents each of the cylinders of the 4 cylinder internal combustion engine and 31 the usual spark plugs constituting an essential electrical factor of such engine; 32 is the fly-wheel, 33 the live portion of the clutch or clutches; the spark-coil is indicated at 34; the "spark advance" or commutator at 35; the source of electric supply is preferably of the constant potential type, being in duplicate and consisting of the battery 36 and the power generator 37. Attention is called to the fact that the latter is supplied with two commutators 38, in such a way as to constitute a constant potential variable speed power-driven generator, associated and interconnected with the battery 36 through automatic disconnecting switch 40 and also to the essential electric factor of the power source through switch 41 and also sustains electrical connection to the electro-magnetic clutches through the controller 9, the connections being such that either generator may be depended upon to supply the demands of any of the translating devices, the generator 37 being connected with the power source 29 by gearing 37'; it will be seen that its speed will vary with the speed of the power source.

Referring now to the speed reducing gearing shown in Fig. 2, 32 is the fly-wheel, bearing the clutch faces 33, interior to which are a pair of suitable clutches 42 and 43, for instance the electro-magnetic clutch may be used, described in detail farther on. One of these is attached to the main shaft 44 while the other serves to operate a sleeve 45. The sleeve may be mounted in ball bearings, as shown near its end, whereas the main shaft is journaled within the fly-wheel at 46 near its other extremity at 47. Upon the sleeve 45 is feathered a secondary sliding sleeve 48 upon which are mounted gears 49 and 50 which may mesh respectively with gears 52, 51, or the usual reverse gear 53, the two former being upon the "jack" shaft 54, whereon are also one or more drive gears 55—driving the respective clutches 56 and 57, by means of which either may be coupled for driving the main shaft 44. The clutches 56 and 57 are double acting as to speed direction of the torque which they transmit, whereas clutches 42 and 43 may be unidirectional only, inasmuch as the engine runs only one way. The usual radius shaft 38 leading to the rear axle, is coupled with the main shaft 44 by the usual universal coupling indicated at 59. It will thus be seen that when clutch 43 and either of the clutches 56 and 57 are engaged, that the main shaft is driven around through the jack-shaft 54 through either of whichever pair of gears is meshing between the sleeve 48 and the jack-shaft, thus forming two speeds for the lower speed connection, which may be considered as being either through clutch 56 or clutch 57, as the case may be, admitting of eliminating one of these clutches entirely; or the direction of motion may be reversed by the usual engagement by way of the third gear 53.

Referring now to Fig. 3, the driver 33 may be either conical or of the straight bore, as shown in Figs. 4, 5 and 6, the preferred form.

Working interior to the driver 33, is the metallic friction ring 61 into the periphery of which are cut spiral slots having large bottoms indicated at 62. These are preferably in the form of a spiral such as would be produced by a screw thread, the preferred form being that these slots consist of a double screw thread for purposes of aiding in winding and of better distribution of wear upon the surface of the driver 33. Within the enlargement of a slot 62 are circumferential windings of insulated electrical conductor. The slots above the enlargement are filled in with some solid substance, such as Babbitt metal or the like; upon passage of the current through the windings, the powerful magnetic poles are set up of alternate polarity, as shown, vigorously attracting the part 33, the relative direction of rotation being such that the screw upon slipping, tends to turn in and tighten within the conical bore, the cone being of such a pitch that an instant release is made upon cessation of magnetization. The internal portion of this clutch in this instance is mounted through hub 44' upon shaft 44. Passing now to magnetic clutch shown in Figs. 4 and 5, we have a symmetrical ring 63, the cylindrical face of which loosely fits the bore of the driver 33, the ring being parted at the top of the figure and provided with engagement lugs 64—64'. The ring 63 is held out symmetrically toward the surface of the bore of the driver 33 by the brackets 65 upon the arms 65', rising from the hub 44'. One of the uppermost arms 65' is larger than the others and serves as a driver, receiving the thrust from the engagement lugs 64—64'. The ring 63 may be spiral or of equivalent form so as to pass around more than once as described by me heretofore. The inner face of the driver disk is machined and adapted to receive the active face of the magnet 66, which is furnished with slots 62' upon this face, in which are windings, one end of which is shown at 66', the other end being grounded and indicated at 66'', being brought out and fastened under the screw head 60, as shown. The magnet 66 is loosely mounted upon the brackets 67, coming from the front portion of the arms 65' and at its top is provided with an upward and outward projection 68, seen in Fig. 4 as lying loosely between the ends of the ring 63. The slip-ring 69 is supported upon hub 44' but insulated therefrom, as shown at 69', and serves to receive the magnet conductor 66'. Referring now to Fig. 6, the bracket 65 and the driving arm 65', also the driving bracket 64' of the ring 63, are seen as shown in Figs. 4 and 5—but one end of this ring is provided with transverse slots 62'—62', etc., in which are electric coils for magnetization of this end of the ring. The operation in Fig. 3 is apparent.

The operations in Figs. 4 and 5 are as follows: The magnet 66 being free to rotate upon the brackets 67, upon being magnetized, adheres to a greater or less extent to the inner face of the rotating driver disk, starting to rotate therewith until the projection 68 is brought into engagement with one end or the other of ring 63, which causes expansion of this ring, this expansion being accentuated and added to by the frictional engagement with the bore of driver 33, which, it will be noticed, is running in the same direction. This constitutes a very powerful inverted "snubbing post" action and it has been found that a few pounds, or even ounces, applied initially from the magnet to the free end of the ring 63, through the bracket 68, will cause a number of hundred pounds of thrust to be delivered from the driving bracket at its other extremity. This driving bracket, engaging the arm 65' causes a powerful torque to be transmitted to the hub 44', this thrust being proportional to the magnetization, which may be controlled by varying the applied current, even though it be minute. It will be noticed that the clutches shown in Figs. 4 and 5 work equally well in either direction, whereas the clutch shown in Fig. 6 is intended for single direction only viz: in the direction of the arrow in this figure, the application of the clutch being due to magnetization generated in the free end of ring 63, the resulting accumulated driving force being developed at the bracket 64', driving the arm 65' as before.

Referring now to Figs. 7, 8 and 9 showing the details of controller 9 in Fig. 1; upon the controller shaft 9', is mounted the interlocking ring 21, also seen in Fig. 1, through a slot in the projecting ring of which the arm 20, extending to the reversing and change gears, may be made to pass. Dotted lines above and below show the positions of rest of this arm when in forward and backward positions respectively, the latter being inside of the rim of ring 21 and adapted to engage the stop 21' for preventing the controller 9 from making its full excursion, therefore preventing full application of power when the reverse gear is in, cutting it down to any predetermined portion, depending upon the location of the stop. Coöperating with the surface contacts of controller 9 is a row of contact brushes 10 connected with the cable 10'; these brushes are mounted upon an insulating block 70 hinged at 71 through the bracket 72. Upon the far end of this bracket a rectangular portion 73 is formed, containing the ball 74 and through a slot 75 in its upper face, see Fig. 9, the disk 76 is allowed to rotate freely. The floor of the cavity within the rectangular projection 73 makes an obtuse angle with the radius of disk 76, in such a way that whenever the disk is turned in the direction of the arrow, the ball 74 is forced to the lower end of the floor or run-way and the bracket 72 is caused to turn upon its hinge 71 and the brushes 10 are turned away from the controller 9, compressing the spring 77 and holding the parts in this position during rotation of the controller in the direction of the arrow and returning them to their normal position shown in the drawing, by the spring 77, at once upon starting the rotation in the opposite direction. Any equivalent device may be used to fulfil this function and hold the brushes 10 disengaged from the controlled cylinder 9 or otherwise render the controller inoperative during its operation in one direction.

Referring now to Fig. 10 which shows a diagrammatic arrangement of circuits through the clutches, generator, etc., and also the development of the cylinder 9, it will be seen that there are three principal positions indicated by the Roman characters I, II, III; subsidiary to each there are four positions of control, indicated by the Arabic numerals adjacent to these characters. 10 indicates the row of brushes and 37 the source or sources of electrical supply. R indicates an electrical resistance tapped by five (5) auxiliary brushes and a main brush being the 3rd one from the left. The four farthest to the right lead each to one of the clutches of Fig. 2, indicated by the corresponding number, viz. 42, 43, 56 and 57. The common return circuit 11 is here also plainly seen. The normal running positions of the controller are indicated by the Roman characters, the approaches by the first three subsidiary Arabic numerals under each;

although no harm is done by running any of the intermediate positions. During this time the variable speed clutches 43 or 42 are being gradually energized. With clutch 43 either of clutches 56 and 57 have become energized and preferably have become locked. The gradual energization or application of current is effected through the removal by degrees of the R through the 5 smaller contacts being brought into successive contact with the beveled edge of one or another of the three centrally located plates of the controller. In the spaces between these three are two groups of three short contacts, the connections being indicated, the purpose, as seen, being to reverse a small quantity of current only, through the clutch coils for a very brief interval, for purposes of a more instantaneous demagnetization and disengagement of clutches, this takes place at position 0 and also at position 0' in the rotation of controller cylinder 9. The method of operation of the plant with a view to manipulation of running factors such as valve 28 of the power source, by cam 22, and the stop 21', with reference to the controller positions, may be stated as follows: Advancing from the off-position to position I—1, clutch 56 is set; clutch 43 starts and is gradually applied up to I—4, where its application is complete and no slipping takes place. When the reverse gears are thrown on, the locking arm 20 being in its low position in Fig. 7, it is engaged by the stop 21' at this point and the application of no further clutches is permitted than this, which is the first or low speed, the position of stop 21' may be altered to suit any required conditions. If the gearing is in the forward position however, between I—3 and I—4, the cam 22 operates on the valve 28 so as to somewhat accelerate the engine 29. In the next position 0 of the controller the same cam drops back and prevents the engine from racing, whereupon the clutches 43 and 56 are first open-circuited, then reversed at position 0 and at II—1 clutches 43 and 57 start their energization, the windings may be so adjusted that the latter becoming fully energized while the former is simply starting through the relative number of turns on each magnet or by their resistance or resistance in the circuits of each, the cam 22 leaving the valve 28 in medium position. The clutch 43 is more and more fully applied to point II—3 where the speed of the engine is again accelerated to II—4 through the action of cam 22 as before and again at 0' the clutches are open-circuited and reversed and the engine is throttled, to be opened again at III—1; all of the clutches connected with the gears are now eliminated and the direct drive clutch 42 alone is partially energized, the gradual application becoming complete at position III—4 of the controller cylinder 9. The clutches may be applied in the reverse order during the reverse movement of the controller cylinder 9 but I prefer to run the set idle during return motion of this cylinder, as by the device shown in Figs. 7, 8, and 9 or their equivalent. It will thus be seen that the clutches upon opposite ends of the speed reducing gears are simultaneously applied, while between these clutches and the main clutch 42, a dis-simultaneous application is employed. The speed reduction or reducing gear is seen to be provided with means for changing the gear ratio and also for reversing the motion, which are interlocked with the controlling mechanism. Clutches 42 and 43 are single acting or uni-directional whereas clutches 56 and 57 are preferably double acting as to speed direction. The speed control of the power source as above described is seen to be so timed as to operate between the application of the clutches. The interlock between the brake operating mechanism and the clutch applying mechanism and the possible actuation of the latter through the former for bringing about the disengagement of the clutches when applying the brake, is plainly shown in Fig. 1. Means for interrupting the operation of the clutch applying mechanism during progression in one direction, rendering it operative during progression in the opposite direction, have also been fully explained in connection with Figs. 7, 8 and 9.

It will be understood that the invention is not limited to the exact details nor in the exact relation in which they have been shown and described herein, inasmuch as many may be altered, equivalents may be employed and some may be omitted without departing from the spirit of the invention which extends to such use and arrangement.

I claim:

1. In a vehicle, a source of power, a propelling means for the vehicle, driving connections between said source of power and said propelling means, said connections including a rotatable drum presenting a cylindrical surface, a rotatable element concentric therewith, an expansive band supported by said element close to said surface, a driving connection between an end of the band and the element, a device supported by said element adjacent a portion of said drum and adapted to engage the other end of the band, and means for drawing said device into engagement with said drum, whereby a relative movement between the element and band is effected.

2. In a vehicle, a source of power, a running gear for the vehicle, a speed changing mechanism located between the source of power and the running gear, electrical means for operating said mechanism, a foot pedal upon the vehicle, an electric switch in circuit with said electric operating means, and a mechanical connection between the pedal and the switch for operating the latter.

3. In a vehicle a source of power, a running gear for the vehicle, a speed reducing mechanism located between said source of power and said running gear, said speed reducing mechanism including a clutch having a radially expanding band for establishing a power transmitting connection between the source and the mechanism and means for expanding said band, including an electrically magnetized member adapted, on being energized, to be rotated by said drum and expand the band.

4. In a vehicle, a source of power, a running gear for the vehicle, a speed changing mechanism located between the source of power and the running gear, electrical means for operating said mechanism, a foot pedal upon the vehicle, an electric switch in circuit with said electric operating means, and a contact on said switch adapted to be engaged by said pedal at a predetermined point in its excursion.

5. In a vehicle a source of power, a propelling means for the vehicle, a plurality of driving connections between said source and said means, said driving connections including a rotatable drum presenting a cylindrical friction surface, a radially tightening band for engaging the surface, a second rotatable element upon the same axis supporting the band close to the said surface, a driving connection between one end of the band and the element, a device for tightening the band against the surface rotating with the element and operating upon the other end of the band and means for operating the device which tightens the band and thus establishes the power-driving connection and a common means for operating each of the driving connections.

6. In a vehicle a source of power, a running gear for the vehicle, a speed changing mechanism located between the source of power and the running gear, said speed changing mechanism including a clutch, an electrical actuator for the clutch, a foot pedal upon the vehicle, an electric switch in circuit with the electric actuator and a mechanical connection between the pedal and the switch for operating the latter.

7. In a vehicle a source of power, a running gear for the vehicle, a speed changing mechanism located between the source of power and the running gear, said speed changing mechanism including a clutch, an electrical actuator for the clutch, a foot pedal upon the vehicle, an electric switch in circuit with the electric actuator, a mechanical connection between the pedal and the switch for operating the latter and a contact coöperating with such switch during a predetermined position only of the pedal.

8. In a vehicle a source of power, a running gear for the vehicle, a speed changing mechanism located between the source of power and the running gear, said speed changing mechanism including a clutch, an electrical actuator for the clutch, a foot pedal upon the vehicle, an electric switch in circuit with the electric actuator, a mechanical connection between the pedal and the switch for operating the latter and a contact coöperating with such switch during a predetermined position only of the pedal, such position being so located as to occur at an intermediate point in the excursion of the pedal.

9. In a vehicle, a source of power, a running gear therefor, a variable speed reducing gear and a direct drive connection located between the source and the running gear, a clutch between each and the said source, means for application of the clutches, means for varying the speed of the speed reducing gear, and an interlock between the means of application of the clutches and the speed varying means.

10. In a vehicle, a source of power, a vehicle running gear, a reversible speed reduction gear and a direct drive connection located between the source and the running gear, a clutch between each and the said source, means for application of the clutches, means for operating the said reversible speed reduction gear, and an interlock between the means of application of the clutches and the said operating means.

11. In a vehicle, a source of power, a running gear therefor, a clutch located between them, capable of sustaining variable engagement with the said power source and a variable magnetic device forming a part of such clutch and means for varying the magnetism of the device.

12. In a vehicle, a source of power, a running gear therefor, a friction clutch located between them, capable of sustaining variable engagement with the said power source, and a variable magnetic device for controlling the friction of such clutch, and means for varying the magnetization of the device.

13. In a vehicle a source of power, a running gear therefor, an electromagnetic friction device located between them, capable of sustaining variable engagement with the said power source and an electrical means for varying the application of the device.

14. In a vehicle, a source of power, a running gear for the vehicle, a speed reduction gear and a direct drive connection located between the source and the running gear, a unidirectional clutch between each and the said source and a common means of application for the clutches.

15. In a vehicle a source of power, a running gear for the vehicle, a speed reduction gear and a direct drive connection located between the source and the running gear, a clutch between each and the said source, and an additional clutch double acting as to speed direction between the reducing gear and the running gear and means of application for the clutches.

16. In a vehicle a source of power, a running gear for the vehicle, a speed reduction gear and a direct drive connection located between the source and the running gear, a clutch between each and the said source, means for varying the speed of the power source, means for applying the clutches and a common actuator for the last two means.

17. In a vehicle a source of power, a running gear for the vehicle, a speed reduction gear and a direct drive connection located between the source and the running gear, a clutch between each and the said source. means for varying the speed of the power source, means for applying the clutches dissimultaneously and a common actuator for the last two means so timed that a speed control is operated between the application of the clutches.

18. In a vehicle, a source of power, a running gear for the vehicle, a speed reduction gear and a direct drive connection located between the source and the running gear, a clutch between each and the said source, means of application for the clutches, brakes and brake operating mechanism for the vehicle and an interlock between such operating mechanism and the clutch applying means.

19. In a vehicle a power source having an essential electrical factor, a running gear, an electrically operated clutch between the said source and the running gear, and a source of electrical supply common to the clutch and to the electrical power source factor.

20. In a vehicle a power source. an essential electrical factor for such power source, a running gear, a plurality of electrically operated clutches between such power source and the running gear, a source of electrical supply and an electrical conductor common to the clutches and the factor and the source of electrical supply.

21. In a vehicle a power source having an essential electrical factor, a running gear, an electrically operated clutch between the said source and the running gear, a power driven source of electrical supply common to the clutch and to the said electrical factor, and a power driving connection between the source of electrical supply and the power source.

22. In a vehicle a power source having an essential electrical factor, a running gear, an electrically operated clutch between the said source and the running gear and a plurality of sources of electrical supply common to the clutch and to the electrical power source factor.

23. In a vehicle a power source having an essential electrical factor, a running gear, an electrically operated clutch between the said source and the running gear, a plurality of sources of electrical supply common to the clutch and to the electrical power source factor, and interconnections between the individual sources of electrical supply.

24. In a vehicle a power source having an essential electrical factor, a running gear, an electrically operated clutch between the said source and the running gear a plurality of sources of electrical supply common to the clutch and to the electrical power source factor, one of such sources of electrical supply being a power generator, and power connections between it and the power source.

25. In a vehicle a power source having an essential electrical factor of the constant potential type, a running gear, an electrically operated clutch of the constant potential type between said source and the running gear, a constant potential electrical generator common to the said factor and clutch and actuating electrical connections between the generator, the factor and the clutch.

26. In a vehicle a power source having an essential electrical factor of the constant potential type, a running gear, an electrically operated clutch of the constant potential type between the said source and the running gear, a constant potential power-driven electrical generator, common to the said factor and clutch, actuating electrical connections between the generator, the factor and the clutch and a power driving connection from the power source to the generator.

27. In a vehicle a power source having an essential electrical factor of the constant potential type, a running gear, an electrically operated clutch of the constant potential type between the said source and the running gear, a constant potential power-driven variable speed electrical generator common to the said factor and clutch, actuating electrical connections between the generator, the factor and the clutch and a power driving connection from the generator to the power source.

28. In a vehicle a power source having an essential electrical factor of the constant potential type, a running gear, an electrically operated clutch of the constant potential type between the said source and the running gear, a plurality of electrical generators, one of which consists of a power driven constant potential variable speed generator common to the said factor and clutch, actuating electrical connections between the generator, the factor and the clutch and between the generators and a power driving connection from the generator to the power source.

29. In a vehicle, a source of power, a running gear for the vehicle, a speed reduction gear and a direct drive connection located between the source and the running gear, a clutch between each and the said source, means for application of the clutches, brakes and brake operating mechanism for the vehicle and operating connection extending from the brake to the clutch applying means.

30. In a vehicle a source of power, a running gear for the vehicle, a speed reduction gear and a direct drive connection located between the source and the running gear, a clutch between each and the said source, means for application of the clutches, brakes and brake operating mechanism for the vehicle and operating connection between the mechanism and the clutch applying means, so organized that in applying the brake, the the clutch or clutches are disengaged.

31. In a vehicle a source of power, a running gear for the vehicle, electrically operated clutches between the said source and the running gear, an electrical controller for the clutch having a high and a low speed position, brakes and brake operating mechanism for the vehicle and an operating connection for the mechanism to the electrical controller, organized to turn the control to the lower speed position in the act of applying the brake.

32. In a vehicle a source of power, a running gear for the vehicle, electrically operated clutches between the said source and the running gear, an electrical controller for the clutch, having a high and a low speed position, intermediate progression between them and means for interrupting the electrical connection for the clutch during the operation of the progression in one direction, and maintaining the connection during the progression in the other direction.

33. In a vehicle a source of power, a running gear for the vehicle, electrically operated clutches between the said source and the running gear, an electrical controller for the clutch having a high and a low speed position, an intermediate progression between them and means for rendering the controller operative during the operation of progression in one direction and inoperative during the operation of progression in the opposite direction.

34. In a vehicle a source of power, a running gear for the vehicle, electrically operated clutches between the said source and the running gear, an electrical controller for the clutch, having a high and a low speed position, an intermediate progression between them, means for rendering the controller operative during the operation of progression in one direction and inoperative during the operation of progression in the opposite direction, and a plurality of means for operating the controller.

35. In a vehicle a source of power, a running gear for the vehicle, speed change gearing lying between the source and the running gear, electrical means for changing from one speed to another by disengaging one of the gears from the power source, a controller for the electrical means and mechanism connected therewith for controlling the speed of the power source during the interval of such disengagement.

36. In a vehicle a source of power, a running gear for the vehicle speed change gearing lying between the source and the running gear, electrical means for changing from one speed to another by disengaging one of the gears from the power source, a progressively acting controller for the electrical means and mechanism connected therewith for controlling the speed of the power source, just previous to and also during the interval of such disengagement.

37. In a vehicle a source of power, a running gear for the vehicle, speed change gearing lying between the source and the running gear, electrical means for changing from one speed to another by disengaging one of the gears from the power source, a progressively acting controller for the electrical means and mechanism connected therewith for increasing the speed of the power source, just prior to and afterward decreasing such speed during the interval of such disengagement.

38. In a vehicle a source of power, a running gear for the vehicle, a speed reduction gear and a direct drive connection located between the source and the running gear, a clutch between each and the said source, a common means of application for the clutches, and a plurality of operating devices for the said common means.

39. In a vehicle, a source of power, a propelling means for the vehicle, a plurality of driving connections between them consisting of a rotatable drum presenting a cylindrical friction surface, a radially tightening band for engaging the surface, a second rotatable element upon the same axis supporting the band close to the said surface, a driving connection between one end of the band and the element, a device for tightening the band against the surface operating upon the other end of the band and said second rotatable element, whereby the difference in velocity between the drum and the element tightens the band and thus establishes the power-driving connection, and a common means for operating each of the driving connections.

40. In a vehicle, a source of power, a running gear for the vehicle, a speed reducing gear and also a direct driving connection between them consisting of a rotatable drum presenting a cylindrical friction surface, a radially tightening band for engaging the surface, a second rotatable element upon the same axis supporting the band close to the said surface, a driving connection between the band and the element, a device for tightening the band against the surface located upon the element, whereby the difference in velocity between the drum and the element tightens the band and thus establishes the power-driving connection and a common means for operating each of the driving connections.

41. In a vehicle, a source of power, a running gear for the vehicle, a reducing gear and a direct driving connection between them and also an additional driving connection between the reducing gear and the said direct driving connection consisting of a rotatable drum presenting a cylindrical friction surface, a radially tightening band for engaging the surface, a second rotatable element upon the same axis supporting the band close to the said surface, a driving connection between the band and the element, a device for tightening the band against the surface located upon the element, whereby the difference in velocity between the drum and the element tightens the band and thus establishes the power-driving connection.

42. In a vehicle, a source of power, a running gear for the vehicle, a direct driving connection between them and also a speed reducing gear for connecting the source of power with the running gear and a plurality of driving connections between the reduction gear and the running gear, consisting of a rotatable drum presenting a cylindrical friction surface, a radially tightening band for engaging the surface, a second rotatable element upon the same axis supporting the band close to the said surface, a driving connection between the band and the element, a device for tightening the band against the surface located upon the element, whereby the difference in velocity between the drum and the element tightens the band and thus establishes the power-driving connection.

In testimony whereof I have hereunto set my hand in presence of two subscribing witnesses.

ELMER A. SPERRY.

Witnesses:
THOMAS T. EGAN,
FRANCIS O. PAUST.